Patented Feb. 15, 1949

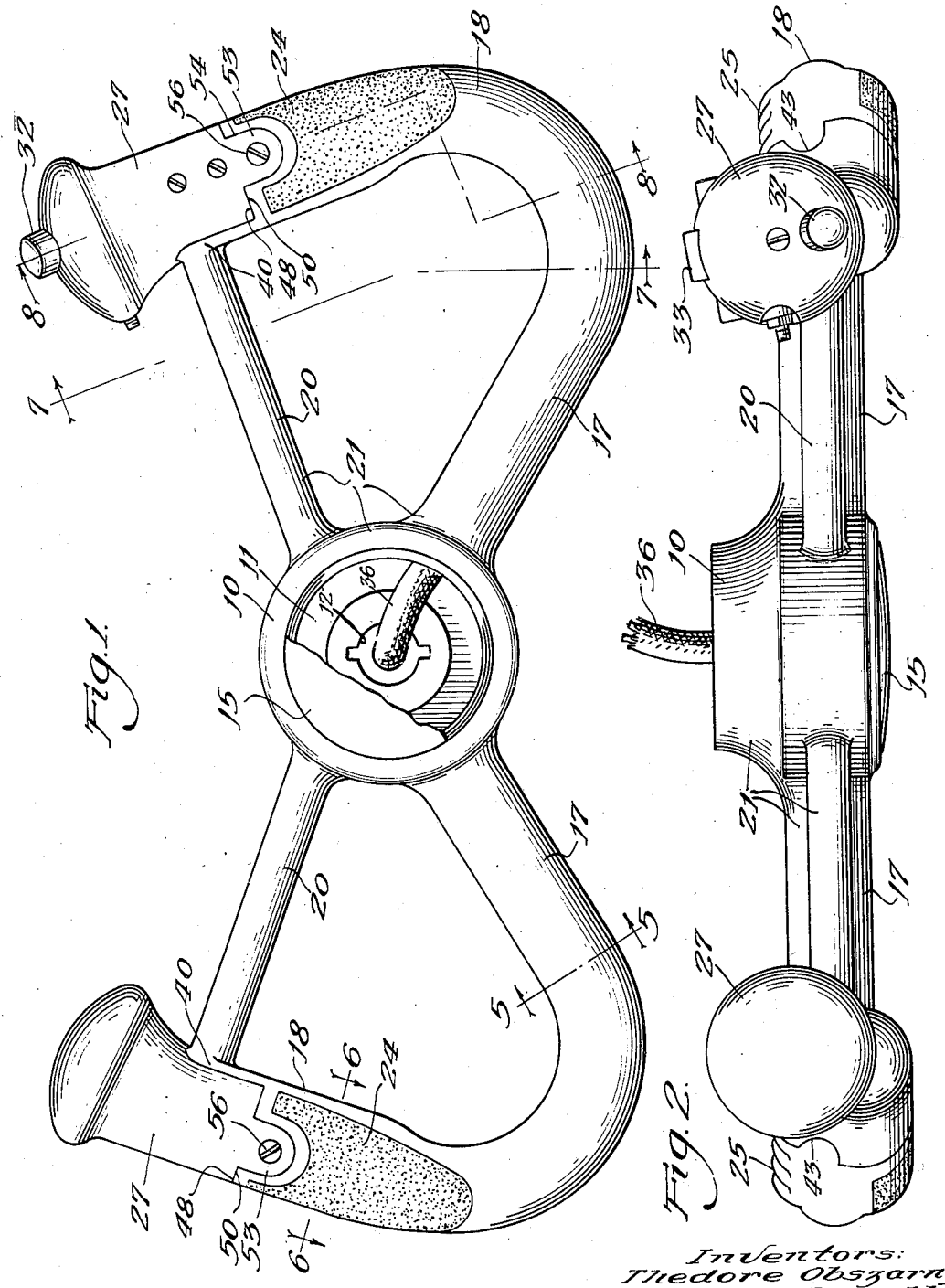

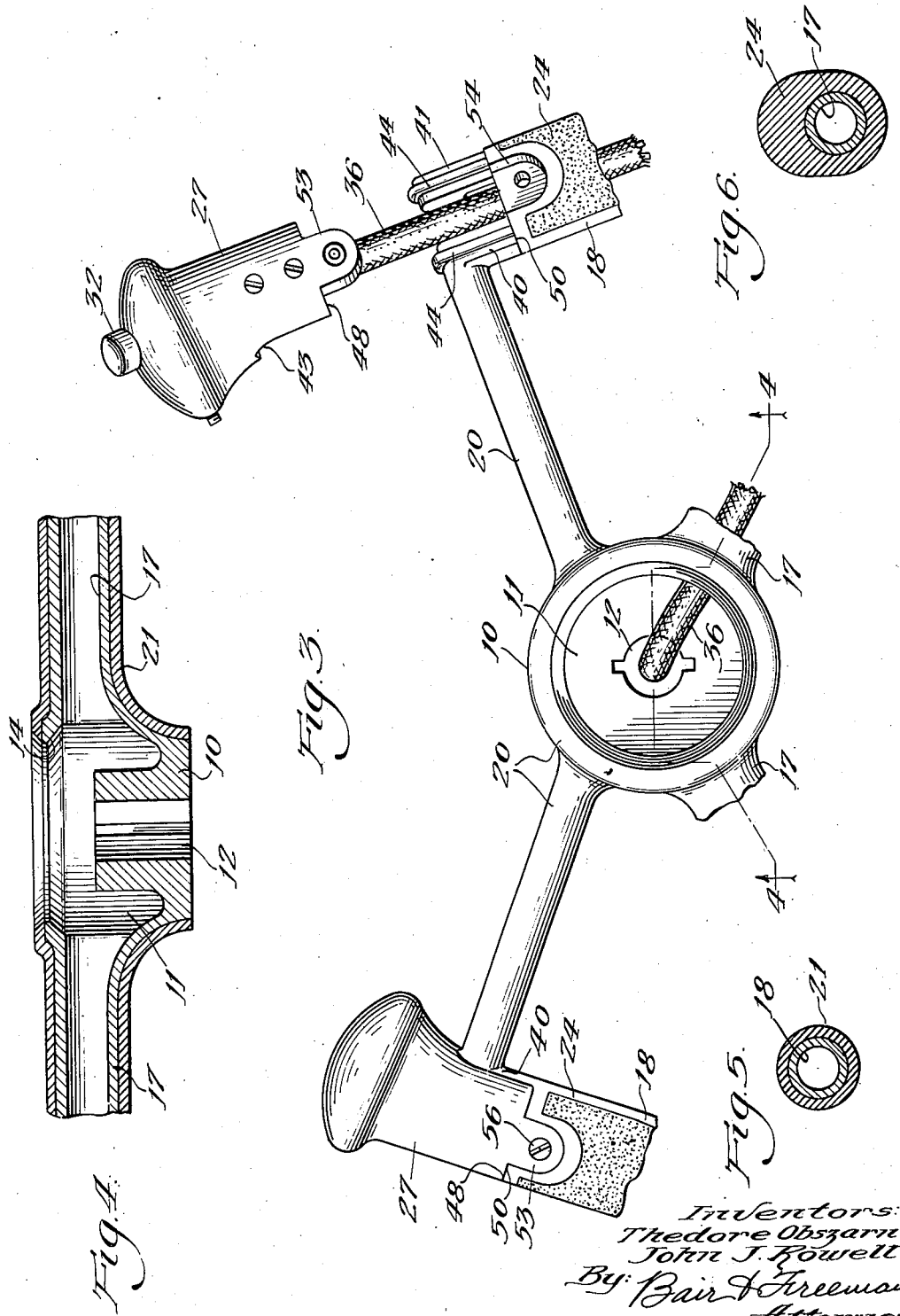

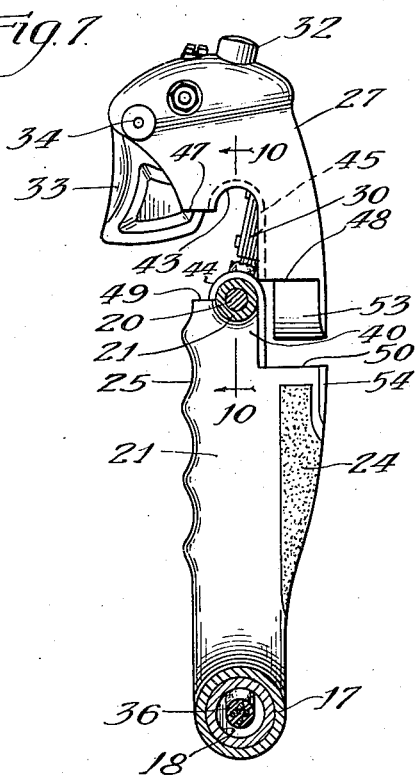
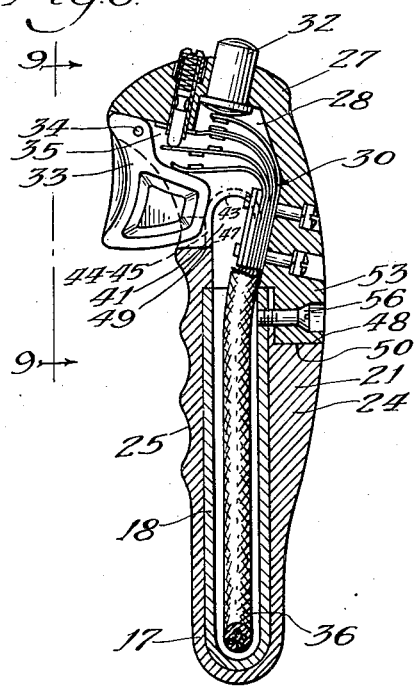
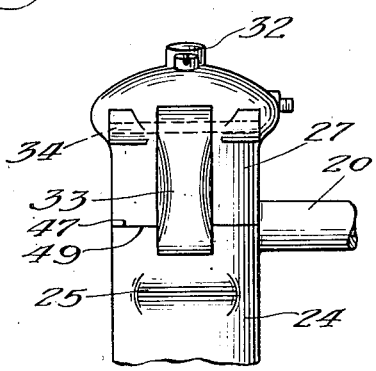
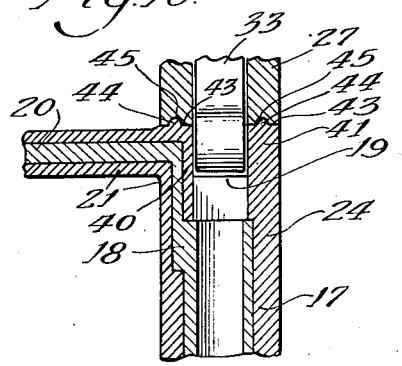

2,461,997

UNITED STATES PATENT OFFICE 2,461,997

HANDGRIP CONTROL

Thedore Obszarny, Chicago, Ill., and John J. Rowell, New York, N. Y., assignors to Guardian Electric Manufacturing Co., Chicago, Ill., a corporation of Illinois Application December 20, 1944, Serial No. 569,086

5 Claims. (Cl. 74—486)

This invention relates to handle structures for control columns of aircraft, and more particularly to hand grip structures for control sticks or as a unitary part of control wheels of aircraft.

It is highly desired in aircraft used in war-fare that the handle structures associated with the control columns be constructed and arranged so as to afford practical convenience in use for controlling the operation of the aircraft, and also be provided with finger and/or thumb-operated switch actuating members for readily and conveniently controlling the operation of various auxiliary electrically controlled apparatus such as, for example, machine guns, cannons, bomb release mechanisms, radio, inter-communication telephone systems, etc. Similarly in aircraft for civilian use, such as in transports, it is likewise desirable to afford the pilot maximum convenience in operating various auxiliary apparatus so as to permit convenience in controlling the operation of various electrically actuated apparatus, such as retractible landing gear, lights, radio, inter-communication telephone, etc.

By virtue of such construction, increased safety is provided for the pilot in maintaining proper control of the aircraft, because the various electrically operated apparatus may be conveniently operated under control of the pilot without the necessity of the pilot removing his hand from the handle structure.

With the foregoing considerations in mind, one of the primary objects of our invention is to provide a novel handle structure of the character indicated, comprising an elongated main body portion formed with a longitudinally extending duct for accommodating conductor wires therethrough, and a head adapted to be detachably connected to and constitute a continuation of the body portion. The head preferably is formed with a suitable chamber in which a switch device is mounted and is adapted to have the conductor wires extend therefrom through said main body portion of the grip structure, for connection with the apparatus to be controlled, and the head being provided with externally accessible switch operating members.

Another object is to provide a novel two-piece handle structure of the character indicated comprising an elongated main body portion and a head detachably connected to and constituting a continuation of the main body portion, the body portion and head being provided with a plurality of circumferentially spaced apart interlocking features for precluding shifting in transverse direction of the head relatively to the body portion, when the parts are assembled together.

A further object is to provide in a control wheel improved hand grip structures wherein each of said structures includes an elongated main body portion formed as a permanent unitary part of the wheel, together with a detachable, interchangeable head adapted for cooperative engagement with the body portion, and wherein the head of one of the grip structures is provided with a chamber for a switch device, together with externally accessible switch operating members carried by the head.

Still another object is to provide an improved control wheel of the character indicated having hand grip structures, each comprising a main body portion formed as a unitary part of the wheel, together with a detachable, interchangeable head adapted for cooperative engagement with said body portion, the head of one of said grip structures being chambered for accommodating a switch therein in a manner so as to afford convenient access to the switch for inspection, repair or replacement.

A still further object is to provide an improved control wheel of the character indicated which is relatively compact, rigid and durable in use, and capable of being economically manufactured.

Other objects and advantages of this invention will be apparent from the following description taken in connection with the acompanying drawings, in which:

Figure 1 is a front elevational view of a control wheel provided with grip structures embodying the present invention.

Figure 2 is a top plan view.

Figure 3 is a fragmentary front elevational view of the control wheel with a head of one of the hand grip structures shown in detached relation to the main body portion of the hand grip.

Figure 4 is a staggered sectional view through the arms and hub portion of the control wheel, taken substantially as indicated on line 4—4 of Figure 3.

Figures 5 and 6 are transverse sectional views through one of the support arms and the main body portion of one hand grip structure, and taken substantially as indicated at lines 5—5 and 6—6 respectively on Figure 1 of the drawings.

Figure 7 is a view, partly in section, taken substantially as indicated at line 7—7 of Figure 1, and showing one of the hand grip structures in side elevation, with the detachable head thereof in disengaged relation to the main body portion of said hand grip structure.

Figure 8 is a longitudinal sectional view through a hand grip structure, taken substantially as indicated at line 8—8 on Figure 1.

Figure 9 is a fragmentary, rear elevational view of the upper portion of one of the hand grip structures, taken substantially as indicated at line 9—9 on Figure 8, and Figure 10 is a fragmentary sectional view through the control wheel and one of the hand grip structures, taken substantially as indicated at line 10—10 on Figure 7, showing fragmentarily the detachable head in connected relation to the main body portion of the hand grip structure, and showing the integral connection between the adjacent support arm and tie member of the control wheel.

While we have shown our present invention as embodied in and constituting a unitary part of a control wheel structure, it will be apparent that it may be readily embodied as a unitary hand grip structure for use in connection with a control stick of an aircraft.

In the construction shown, the control wheel includes a centrally disposed hub 10 of substantially circular cross section, having an annular chambered cavity 11 therein, surrounding a bore 12 adapted for a keyed fit on an operating shaft of the control column of an aircraft. The open forward end of the cavity 11 is of circular outline and is formed with an inwardly projecting, conical undercut wall 14, shown best in Figure 4, with which cooperates a plurality of spring fingers (not shown) of a cap or cover element 15 for completing the closure of the cavity. Integrally connected to the hub and extending obliquely downwardly and outwardly in opposite directions, are a pair of hollow or tubular support arms 17, the interior of which are in open communication with the cavity 11, as clearly seen in Figure 4 of the drawings. The outer terminal portions of said arms continue into upwardly and inwardly directed portions as indicated at 18, the ends of which are integrally connected to the outer ends of a pair of outwardly diverging tie members 20, as clearly seen in Figure 10 of the drawings. The opposite ends of said tie members are connected to and formed as an integral part of the hub 10. The hub 10, together with the arms 17 and tie members 20, are formed as a unitary casting, in the nature of a spider. The entire spider, including the hub, the support arms and the tie members, has molded around the outer surface thereof a substantial thickness of suitable insulating material as indicated at 21, such as "Tenite."

The molded "Tenite" on the upwardly extending portions 18 of the support arms is formed of substantial thickness and in a contour so as to constitute a main body portion 24 of a hand grip structure, as clearly seen in the drawings. The rear face of the hand grip body portions 24 are each formed with a sinuous contour, as indicated at 25, to afford convenient finger seats in gripping the body portion. Cooperating with each of the body portions 24 of the hand grip structures, is a detachably connectible, interchangable head 27, preferably molded of suitable insulating material such as "Tenite." The contour of the heads is such that when connected in assembled relation to the body portions 24, they constitute a continuation thereof, for producing a complete hand grip structure as seen in Figures 1 and 8 of the drawings.

The detachable heads 27 are substantially identical in form and contour, and are each provided with a suitable cavity 28. Preferably in the cavity of at least one of said heads is a fixedly mounted unitary switch assembly, as indicated at 30. As may be seen in the drawings, the detachable head constituting a part of the hand grip structure at the right hand side of the control wheel is provided with the switch device, and the head of the left hand hand grip structure is in the form of a "dummy." If desired, both heads of the hand grip structures may be identical and provided with similar switch structures.

The purpose of making the heads interchangeable on the two hand grip structures is primarily for accommodating the preference of location of certain controls for different pilots. If, for example, both the heads of the hand grip structures are provided with switch devices, the switches of one hand grip serving to control a certain group of electrically operated apparatus and the switch device in the other hand grip serving to control a different group of apparatus, it may be that for the pilot's convenience it is preferable to reverse the arrangement to obtain a desired form of control of said apparatus. This may be accommodated by merely interchanging the heads as will be hereinafter more fully described.

The switch device indicated generally at 30 is of the triple type for controlling three different electrical circuits through the medium of a push button type of operating member 32, and a trigger member 33, pivoted at 34 in an opening 35, in communication with the switch cavity 28 of the head. The particular switch structure and method of operation thereof do not form any part of the present invention and are clearly and fully disclosed in the co-pending application of Thedore Obszarny, Serial No. 533,733, filed May 2, 1944, now Patent No. 2,381,077 and no further detailed description thereof is believed necessary.

The terminals of the switch structure are connected to suitable conductor wires enclosed in a common sheath as indicated at 36, which conductor wires are adapted to extend downwardly through the interior of the hollow support arm 17, and extend into the cavity 11 of the hub of the control wheel, and thence through the tubular shaft of the control column for connection to the terminals of various electrically-operated apparatus to be controlled by the switch assembly 30.

Each main body portion 24 and the detachable head adapted to be connected thereto are formed with a plurality of circumferentially spaced apart inter-engaging tongue and groove features which serve to properly connect the elements together in cooperating relation, and serve to preclude transverse shifting of the head with respect to the main body portion when the parts are assembled. The tongue and groove features comprise a pair of tongue members 40 and 41 at opposite sides of each of the body portions 24, which are rounded at their upper ends and adapted for seating in corresponding formed notched out portions or openings 43, in the sides of the head 27, as clearly seen in the drawings.

It happens, as may be seen in the drawings, that the rounded upper end of the tongue member 40 is substantially concentric with the upper semi-circular portion of the insulated coating of the tie member 20. To further insure exact positioning of the head with respect to the main body portion and to also provide guidance in connecting the parts, as well as serving to provide a dust tight connection to a substantial extent for the chamber 28 in which the switch device is mounted, said tongue members 40 and 41 are provided with transversely projecting ribs 44, extending around said tongues and adapted to seat in correspondingly formed grooves 45, formed in each of the side walls of the head in corresponding surrounding relation to the notched out portions 43. Each side of the head is formed with transverse abutment shoulders 47 and 48, which are adapted to seat against correspondingly formed shoulders 49 and 50, on the main body portions 24 of the hand grip structure.

The front face of the head, at its lower end, terminates in a tongue element 53 which is adapted to seat in a correspondingly formed notched out portion 54 in the front face of the upper end of the main body portion 24. Thus the three sets of tongue and groove connections tend to properly position the head with respect to the main body portion 24 when assembled thereto and the two sets of ribs 44 and the cooperating grooves 45 in the head further insure proper guidance and alignment of the head as it is being connected to the main body portion, and in addition serve to reinforce the connection of the parts. When the head is properly assembled with respect to the main body portion 24, it may be detachably connected in place by means of a single screw 56 adapted to be projected through the tongue portion 53, and threaded into the upper end 18 of the hollow support arm of the spider of the control wheel, as clearly seen in Figure 8 of the drawings.

When it is desired to interchange the heads of the two hand grips, it is merely necessary to disconnect the ends of the conductor wires from the terminals of the apparatus to be controlled, and remove the screws 56 so as to permit the heads to be withdrawn together with the conductor wires, which are pulled through the tubular arms 17. When the heads are connected at the opposite sides of the wheel, the conductor wires are merely threaded through the support arms and into the cavity of the hub in a manner as above described.

It will be apparent that by virtue of the construction shown and described it is now possible to readily and conveniently inspect, repair or replace a switch device in a demountable head, and, if desired, to expedite such replacement a complete head assembly containing a switch and operating members may be readily substituted without appreciable loss of time.

In aircraft construction the matter of weight is always an important factor, and we therefore prefer that the spider of the control wheel be formed of light weight metal, such as aluminum. Because of the great hazards in use of exposed metal surfaces on control wheels of aircraft, particularly at low temperatures, which may result in "freezing" a portion of the pilot's body to the exposed metal upon direct contact therewith, it is preferred that the coating employed, such as "Tenite," serve to provide adequate insulation for the human body to prevent adherence to the wheel upon contact therewith.

Although we have shown and described a preferred embodiment of our invention, manifestly it is capable of modification and rearrangement of parts without departing from the spirit and scope thereof. We do not, therefore, wish to be understood as limiting this invention to the precise construction herein disclosed, except as it may be so limited in the appended claims.

We claim as our invention:

1. A control wheel for aircraft comprising a hub provided with a cavity therein, a pair of oppositely disposed, downwardly and outwardly extending hollow tubular support arms connected to the hub in open communication with the cavity, said hollow tubular support arms being formed of a light metal core covered by a plastic insulating material of substantially uniform thickness, except at the terminal portions thereof where the plastic material is considerably thickened and formed to provide a hand grip, a head formed of plastic insulating material, means for detchably and rigidly securing the head to the terminal portion of at least one of the support arms, said head being formed to continue the general contour of the hand grip and form a part thereof, a cavity within the head adapted to contain a mechanically movable device, and an externally operated member extending through the head to operate said device.

2. In an aircraft control wheel of the type comprising a hub provided with a cavity therein, and a pair of oppositely disposed, downwardly and outwardly extending hollow, tubular support arms connected to the hub in open communication with the cavity, the outer portions of the arms continuing into upwardly extending terminal portions; the improvement comprising a pair of hand grips for the terminal portions of the arms, said grips each including a main body portion formed as a rigid part and surrounding the terminal portion of one of the respective arms and an interchangeable head detachably connected to the main body portion, one of said heads being chambered, a movable device mounted in the chamber, together with an externally accessible operating member for said device carried by the head, the abutting ends of said heads and body portions being formed with a plurality of cooperating, circumferentially spaced apart tongue and groove features, extending in the direction of connection and disconnection of the parts, and serving to preclude transverse shifting of the parts when assembled in interconnected relation.

3. In an aircraft control wheel of the type comprising an integral metal spider provided with a coating of synthetic plastic material and including a hub provided with a cavity therein, a pair of oppositely disposed, downwardly and outwardly extending, hollow tubular support arms connected to the hub in open communication with the cavity, the outer portions of said arms continuing into upwardly extending terminal portions, and a pair of oppositely extending tie members, rigidly connected at corresponding ends to said hub and to the upper ends of the terminal portions of the arms; the improvement comprising a pair of hand grips for the terminal portions of the arms, said grips each including a main body portion formed as an integral part of the terminal portion of one arm and the connection to the adjacent tie member, and an interchangeable head detachably connected to each main body portion, one of said heads being chambered, a movable device mounted in the chamber, together with an externally accessible operating member for said device carried by the head, each main body portion, in alignment with the tie rod connection thereto, being formed with a pair of spaced apart tongues adapted for engagement with cooperating grooves in the head when the parts are connected together and additional interlocking elements on the head and body portions comprising an extension on said head and a recess on said body, into which said extension projects.

4. In an aircraft control wheel of the type comprising an integral metal spider provided with a coating of synthetic plastic material and including a hub provided with a cavity therein, a pair of oppositely disposed, downwardly and outwardly extending, hollow tubular support arms connected to the hub in open communication with the cavity, the outer portions of said arms continuing into upwardly extending terminal portions, and a pair of oppositely extending tie members, rigidly connected at corresponding ends to said hub and to the upper ends of the terminal portions of the arms; the improvement comprising a pair of hand grips for the terminal portions of the arms, said grips each including a main body portion formed as an integral part of the terminal portion of one arm and the connection to the adjacent tie member, and an interchangeable head detachably connected to each main body portion, one of said heads being chambered, a movable device mounted in the chamber, together with an externally accessible operating member for said device carried by the head, each main body portion, in alignment with the tie rod connection thereto, being formed with a pair of spaced apart tongues adapted for engagement with cooperating grooves in the head when the parts are connected together, each set of tongues and grooves having a set of rib and groove interlocking features extending transversely of the planes of connection of said sets of tongues and grooves.

5. A handle structure for a control column of an aircraft, comprising an elongated main body portion, having a duct extending longitudinally therethrough, a head portion removably connected to the end of the main body portion, and a chamber therein adapted to be disposed in open communication with the duct when the two portions are connected together, a movable device mounted in the chamber, and an externally accessible operating member for said movable device carried by the head portion, said body and head portions, having a plurality of circumferentially spaced apart sets of tongue and groove features, extending in the general direction of connection and disconnection of said portions and adapted to preclude transverse shifting of the head portion relatively to the body portion when the portions are assembled, two of said sets of tongue and groove features being aligned on opposite sides of the assembled hand tructure, and two sets including auxiliary rib and groove features extending in a direction transversely of the planes of connection of said two sets of tongue and groove features, and means for rigidly connecting the body and head portions in assembled relation.

THEDORE OBSZARNY.
JOHN J. ROWELL.

REFERENCES CITED

The following references are of record in the file of this patent:

UNITED STATES PATENTS

| Number | Name | Date |
|---|---|---|
| 1,457,967 | Erhardt | June 5, 1923 |
| 1,804,442 | Smith | May 12, 1931 |
| 2,183,310 | Frantz | Dec. 12, 1939 |
| 2,329,215 | Paulus | Sept. 14, 1943 |